US006774941B1

United States Patent
Boisvert et al.

(10) Patent No.: US 6,774,941 B1
(45) Date of Patent: Aug. 10, 2004

(54) CCD OUTPUT PROCESSING STAGE THAT AMPLIFIES SIGNALS FROM COLORED PIXELS BASED ON THE CONVERSION EFFICIENCY OF THE COLORED PIXELS

(75) Inventors: David Michael Boisvert, Windham, NH (US); Andrew Kenneth John McMahon, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 0 days.

(21) Appl. No.: 09/427,574

(22) Filed: Oct. 26, 1999

(51) Int. Cl.[7] .......................... H04N 5/217; H04N 9/64
(52) U.S. Cl. .................. 348/241; 348/243; 348/250; 348/245
(58) Field of Search ................. 348/241, 243, 348/264, 255, 250, 245, 247, 364; 358/518, 519

(56) References Cited

U.S. PATENT DOCUMENTS

| | | | | | |
|---|---|---|---|---|---|
| 5,448,306 | A | * | 9/1995 | Koyama | 348/678 |
| 5,579,049 | A | * | 11/1996 | Shimaya et al. | 348/364 |
| 5,659,355 | A | * | 8/1997 | Barron et al. | 348/245 |
| 5,703,524 | A | | 12/1997 | Chen | |
| 5,736,886 | A | * | 4/1998 | Mangelsdorf et al. | 327/310 |
| 5,757,440 | A | | 5/1998 | Mangelsdorf | 348/697 |
| 5,841,488 | A | * | 11/1998 | Rumreich | 348/694 |
| 6,005,614 | A | * | 12/1999 | Katayama | 348/241 |
| 6,018,364 | A | * | 1/2000 | Mangelsdorf | 348/241 |
| 6,046,823 | A | * | 4/2000 | Chen | 358/1.9 |
| 6,100,928 | A | * | 8/2000 | Hata | 348/229.1 |
| 6,147,707 | A | * | 11/2000 | Terasawa et al. | 348/229.1 |
| 6,157,407 | A | * | 12/2000 | Kobayashi | 348/241 |
| 6,342,919 | B2 | | 1/2002 | Opris | 348/241 |
| 6,433,632 | B1 | * | 8/2002 | Nakamura et al. | 330/9 |
| 6,587,144 | B1 | * | 7/2003 | Kim | 348/241 |
| 6,597,395 | B1 | * | 7/2003 | Kim et al. | 348/222.1 |

OTHER PUBLICATIONS

Data sheet, "Preliminary Exar," XRD9855/9856; XRD98L55/98L56, CCD Image Digitizers with CDS, PGA, and 10–Bit A/D, pp. 30, Mar. 1999, Exar Corp., 48720 Kato Rd., Fremont, CA.*

Data Sheet, "Preliminary Exar," XRD9855/9856; XRD98L55/98L56, CCD Image Digitizers with CDS, PGA, and 10–Bit A/D, pp. 1–30, Mar. 1999, Exar Corp., 48720 Kato Rd., Fremont, CA.

* cited by examiner

Primary Examiner—Wendy R. Garber
Assistant Examiner—Lin Ye
(74) Attorney, Agent, or Firm—Mark C. Pickering

(57) ABSTRACT

The reduced signal-to-noise ratio of colored pixels that results from a lower conversion efficiency is eliminated by utilizing a programmable gain amplifier which individually applies a gain to the output of each colored pixel so that the maximum signal level of each colored pixel is matched to the maximum input range of an A/D converter.

23 Claims, 5 Drawing Sheets

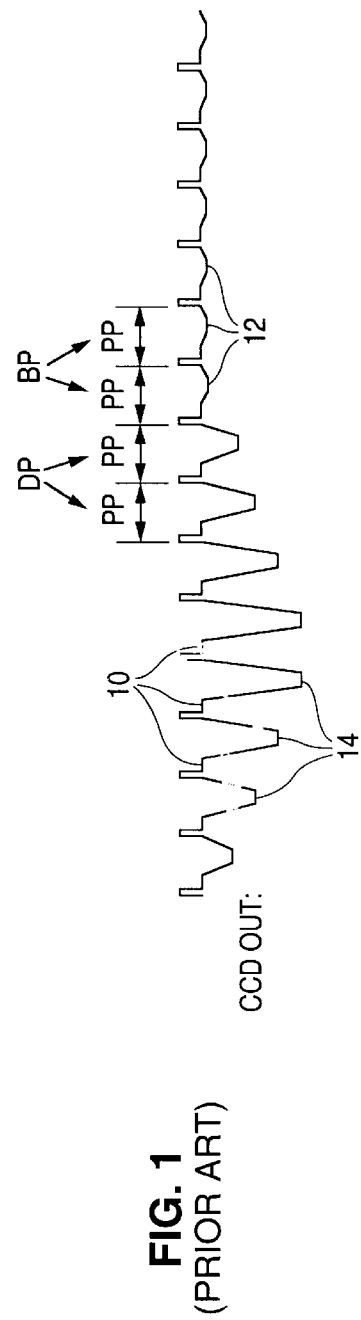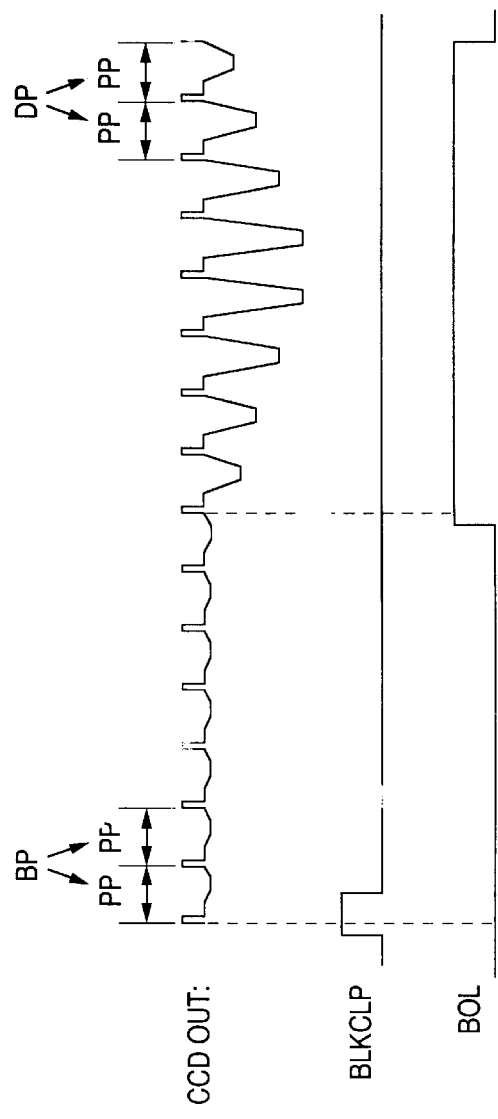
FIG. 1
(PRIOR ART)
FIG. 3

CCD OUTPUT PROCESSING STAGE THAT AMPLIFIES SIGNALS FROM COLORED PIXELS BASED ON THE CONVERSION EFFICIENCY OF THE COLORED PIXELS

BACKGROUND OF THE INVENTION

1. Field of the Invention

The present invention relates to a charge-coupled device (CCD) output processing stage and, more particularly, to a CCD output processing stage that amplifies signals from colored pixels based on the conversion efficiency of the colored pixels.

2. Description of the Related Art

Charge-coupled devices (CCDs) are semiconductor devices that are widely used in conventional image sensors to convert images of visible light into electronic signals that can be captured, transmitted, stored, and displayed. Examples of common consumer devices that utilize CCDs include camcorders and digital still cameras.

In operation, CCDs, which are formed on a layer of silicon, divide an image into a large number of discrete cells or pixels that are arranged in a number of rows (lines). In the silicon beneath each pixel, incident light is converted into a packet of electrons where the number of electrons in the packet represents the intensity of the incident light.

The electron packets formed within the pixels are then transferred across the CCD line by line to an output port. At the output port, the electron packets for each line are dumped, pixel by pixel, onto a diode, thereby forming a CCD output signal which has a number of pixel periods.

An analog processing stage senses the output signal, removes a black signal from the output signal, and outputs an amplified output signal. (The black signal, which varies over temperature and from part to part, represents the voltage that is present when no light is incident on a pixel.)

FIG. 1 shows a timing diagram that illustrates a conventional CCD image signal CCD OUT. As shown in FIG. 1, the CCD image signal CCD OUT has a number of pixel periods PP that include data pixel periods DP and black pixel periods BP. Each time the diode is reset, the image signal CCD OUT moves up to a reset level 10. Following reset, when no light is present, the signal falls to a black signal level 12.

On the other hand, when light is present, the signal level falls from the reset level to a pixel signal level 14. The intensity of the light incident on each pixel is then determined by removing the preceding reset signal level 10 and the black signal level 12 from the pixel signal level 14.

CCDs are often covered with color filter arrays (CFAs) which filter the light entering the CCD into a number of component colors. The pixels are covered by the CFAs so that each pixel receives only one of the colors. CFAs vary in the colors that are used, such as red, green, and blue, or cyan, magenta, yellow, and green, and the pattern in which the pixels that receive each color are arrayed.

When uniform white light shines on a CCD with an integrated CFA, the electron packets formed within the pixels should each have the same number of electrons since white light contains every color in equal proportion. In actual practice, however, the pixels associated with each color fill with differing numbers of electrons.

Thus, the pixels convert light from each of the colors into electrons at a different efficiency. The differences in the conversion efficiency of the pixels associated with each of the colors arises from transmission differences in the color filters as well as differences in the conversion efficiency of silicon across the frequency band of the incident light. As a result, a CCD image processing system must perform a function known as "white balancing" to equalize the signal levels of each color.

In digital imaging systems, an analog-to-digital (A/D) converter is used to convert the amplified signal level from the analog processing stage into a series of discrete digital numbers which represent the signal level of each pixel (after the preceding reset signal level 10 and the black signal level 12 have been removed).

In these systems, the analog processing stage is commonly implemented with a correlated double sampler (CDS) followed by a programmable gain amplifier (PGA) that matches the maximum signal level from the diode to the maximum input range of the A/D converter. If several colors are used in the system, it is general practice to match the color having the highest conversion efficiency (and thus the largest signal level) to the maximum input range of the A/D converter.

One problem with this approach is that the remaining colors, which have smaller maximum signal levels, do not use the full range of the A/D converter. Since, the pixels that receive the remaining colors have a smaller number of electrons, these pixels have smaller signal levels.

Since the noise levels of the CCD and the analog processing stage are fixed, the smaller signal levels of the remaining colors lead to a lower signal-to-noise (S/N) ratio for the remaining colors. The lower S/N ratio results in a picture with more noise in the remaining colors than in the color with the highest conversion efficiency.

In most systems, white balancing occurs after the A/D conversion, usually by applying a unique fixed gain to each remaining color in the digital domain. The problem with this approach, however, is that the poor signal-to-noise (S/N) ratios of the colors with the lower conversion efficiencies are set at the input of the A/D converter and, therefore, are not improved when multiplied by a fixed digital gain.

An approach to alleviate this problem is to use multiple PGAs in lieu of a single PGA so that each of the colors has a corresponding PGA. In this way, the maximum signal level of each remaining color can be amplified to be equal to the maximum input range of the A/D converter, and thereby obtain the best possible S/N ratio for each of the colors. Multiple PGAs, however, consume a large amount of power and are therefore not a preferred approach in battery or other low-power applications.

Thus, there is a need for an image processing stage which includes a single PGA that allows the maximum signal level of each color to be amplified to be equal to the-maximum input range of the A/D converter.

SUMMARY OF THE INVENTION

The present invention provides an image processing stage which allows the maximum signal level of each component color to be matched to the maximum input range of the A/D converter. The processing stage in the present invention processes an image signal that has data on a plurality of component colors.

The image signal also has a plurality of lines where each line has a plurality of black pixel periods and a plurality of data pixel periods. The black pixel periods have a plurality of black signal levels that are defined by a corresponding plurality of black pixels such that each black pixel period has a black signal level defined by a corresponding black pixel.

The data pixel periods have a plurality of data signal levels defined by a corresponding plurality of light-receiving pixels such that each data pixel period has a data signal level defined by a corresponding light-receiving pixel.

The image processing stage of the present invention includes a correlated double sampler (CDS) that is connectable to receive the image signal from a charge-coupled device. The CDS removes a reset signal level from both the black and data signal levels.

The stage also includes a digital-to-analog (D/A) converter that is connected to the CDS. The D/A converter receives a plurality of offset values. One of the offset values is received for the black pixel periods in a line, while the plurality of offset values are received for the data pixel periods in the line such that one offset value is received for each data pixel period in the line. Each offset value is converted into a corresponding offset signal and then output during a pixel period.

The stage further includes a programmable gain amplifier that is connected to the CDS and the D/A converter. The amplifier receives a plurality of digital gain values at a gain input such that a gain value is received for each pixel period. The amplifier amplifies the black and data signal levels in response to a gain value to form an amplified signal level in each black and data pixel period. The gain values represent the component colors such that each gain value represents a single component color.

The stage additionally includes an analog-to-digital (A/D) converter that is connected to the amplifier. The A/D converter digitizes the amplified signal levels in the black and data pixel periods to form a digitized black value for each black pixel period and a digitized data value for each data pixel period.

The stage also includes a controller that is connected to the D/A converter and the gain input of the amplifier. The controller stores and outputs the offset values to the D/A converter, and stores and outputs the gain values to the amplifier.

Further, in an alternate embodiment, an update circuit is also connected to the A/D converter and the controller. The update circuit determines an average digitized value from the digitized black values in a line, and compares the average digitized value with a digital reference value to determine a calculated value for the line. The calculated value of each line represents a component color. The calculated value for each line that represents the same component color is accumulated to form an accumulated calculated value. The controller then updates the offset value that represents the same component color as the accumulated calculated value in response to the accumulated calculated value for the line.

The present invention also includes a method for operating the processing stage. The method includes the step of removing a reset signal level from the black and data signal levels in the black and data pixel periods, respectively, in a line with a correlated double sampler to leave residual black and data signal levels in the black and data pixel periods, respectively, in the line.

The method also includes the step of removing an offset signal from the residual black and data signal levels in the black and data pixel periods, respectively, in the line with a digital-to-analog (D/A) converter to leave an offset-corrected signal level in the black and data pixel periods, respectively, in the line. The D/A converter, in turn, responds to an applied offset value.

The method further includes the step of amplifying the offset corrected signal level in each black and data pixel period in the line with an amplifier to leave an amplified signal level in each pixel period in the line. In addition, the amplified signal level in each pixel period is digitized so that a digitized black value is formed for each black pixel period and a digitized data value is formed for each data pixel period.

In accordance with the alternate embodiment, the method additionally includes the steps of forming an average digitized black value from the digitized black values in a line, comparing the average digitized black value with a reference value to form a calculated offset value, and accumulating the calculated offset value from each line that represents the same component color to form an accumulated calculated value. The applied offset value which the D/A converter responds to for the black pixel periods in the line is then updated in response to the accumulated calculated offset value.

A better understanding of the features and advantages of the present invention will be obtained by reference to the following detailed description and accompanying drawings which set forth an illustrative embodiment in which the principles of the invention are utilized.

BRIEF DESCRIPTION OF THE DRAWINGS

FIG. 1 is a timing diagram illustrating a conventional CCD image signal CCD OUT.

FIG. 3 is a timing diagram illustrating the operation of stage 200 in accordance with the present invention.

DETAILED DESCRIPTION

Figure 2:
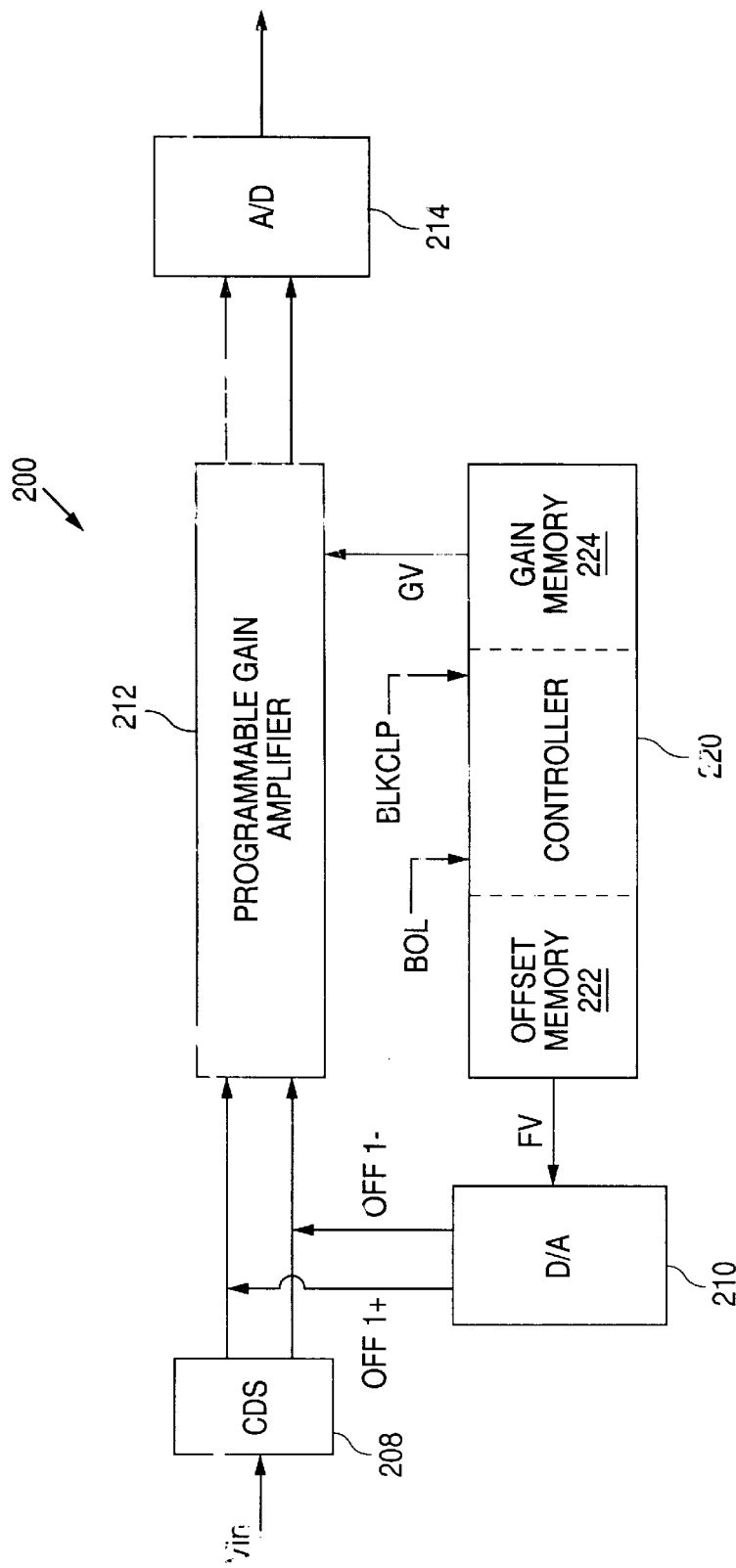
FIG. 2 is a block diagram illustrating an image processing stage 200 in accordance with the present invention.

FIG. 2 shows a block diagram of an image processing stage 200 in accordance with the present invention. As shown in FIG. 2, stage 200 includes a correlated double sampler (CDS) 208 that receives an image signal Vin (referenced to ground) from the output of a charge-coupled device (CCD).

The CCD, which utilizes a large number of image-collecting or data pixels, collects and outputs light energy in two steps. In the first step, the output diode of the CCD is reset to a predefined voltage known as a reset signal level.

In the second step, light is collected by the pixels during an image integration period. Each pixel transforms the received light energy into a charge which is then transferred sequentially onto the output diode of the CCD.

This charge transfer displaces the voltage level of the output diode from the initial reset signal level to a new voltage known as a data signal level. Thus, to determine the amount of light energy that is received by a pixel, the reset signal level must be removed from the data signal level.

In addition to removing the reset signal level from the data signal level, a non-photon signal level must also be removed from the data signal level. The non-photon signal level represents the amount of charge that is collected by a pixel during the image integration period that results from non-photon based sources, such as thermally-generated charge.

To measure the amount of non-photon based charge that is collected by the pixels during the image integration period, the CCD utilizes a number of black pixels which, unlike data pixels, are not exposed to light.

The CCD operates the black pixels in the same manner as the data pixels. As a result, at the end of the image integration period, the non-photon based charge is transferred to the output diode where the charge displaces the reset signal level of the black pixels to a value known as the black signal level. The non-photon signal level is then determined by removing the reset signal level from the black signal level.

Thus, to determine the amount of light energy that is received by a pixel, both the reset signal level of the pixel and the non-photon signal level must be removed from the data signal level of the pixel.

In the CCD, the pixels are arranged in a number of rows or lines. Each line of pixels, in turn, has a number of black pixels that are followed by a number of data pixels (or vice versa). In operation, the CCD is read out line-by-line and, for each line, pixel-by-pixel.

As a result, each line of the image signal Vin has a number of black pixel periods that have a number of black signal levels which are defined by a corresponding number of black pixels such that each black pixel period has a black signal level defined by a corresponding black pixel.

In addition, each line of the image signal Vin also has a number of data pixel periods that have a number of data signal levels which are defined by a corresponding number of data pixels such that each data pixel period has a data signal level defined by a corresponding data pixel.

Further, a color filter array (CFA) covers the data (light-receiving) pixels of the CCD with a fixed pattern of filters that passes a number of component colors. The component colors can include, for example, red, green, and blue; or cyan, magenta, yellow, and green.

The fixed pattern in the CFA includes a predefined number of independent lines which are repeated throughout the array. For example, if a CFA utilizes two independent lines, represented by the first and second lines of the array, then the third and fourth lines, and the fifth and sixth lines, are identical to the first and second lines, respectively.

In addition, each independent line repeats the colors passed by the filters in a different predefined order. For example, with red, green, and blue colors, the filters over the first independent line follow a green-red-green-red order, while the filters over the second independent line follow a blue-green-blue-green order. This order is commonly known as a Bayer pattern.

Thus, in this example, the first, third, fifth, and the subsequent second pixels in the first independent line are covered with a green filter, while the second, fourth, sixth, and the subsequent second pixels in the first independent line are covered with a red filter.

Similarly, the first, third, fifth, and the subsequent second pixels in the second independent line are covered with a blue filter, while the second, fourth, sixth, and the subsequent second pixels in the second independent line are covered with a green filter.

Thus, since each data pixel is covered with one of a number of colored filters, the data signal levels in the data pixel periods represent the component colors such that each data signal level in a data pixel period represents a component color. As a result, the data signal level in a data pixel period, less the reset and non-photon signal levels, is a colored signal level.

Returning to FIG. 2, CDS 208 removes the reset signal level from the black signal levels to leave a residual black signal level in each of the black pixel periods. In addition, CDS 208 removes the reset signal level from the data signal levels to leave a residual data signal level in each of the data pixel periods.

Since the data signal level in each data pixel period represents a component color, the residual data signal level in each data pixel period must also represents a component color. Further, in the preferred embodiment of the present invention, CDS 208 also converts the image signal Vin (from the output of the CCD) into a pair of differential image signals Vin+ and Vin−.

As further shown in FIG. 2, image processing stage 200 also includes a digital-to-analog (D/A) converter 210 that receives a number of offset values FV, and converts the offset values FV into corresponding pairs of differential offset signals OFF1+ and OFF1−. The pairs of offset signals OFF1+ and OFF1− are then output such that one pair of offset signals OFF1+ and OFF1− are output during each pixel period. The offset values FV and the pairs of offset signals OFF1+ and OFF1− represent the component colors such that each pair of offset signals OFF1+ and OFF1− represents a single component color.

During each line of the image signals Vin+ and Vin−, one offset value FV is received for the black pixel periods. (Alternately, as described below, more than one offset value FV can be received for the black pixel periods.) On the other hand, all of the offset values FV are received during the data pixel periods such that one offset value FV is received for each data pixel period.

The offset signals OFF1+ and OFF1− that are output during the black pixel periods in a line are combined with the residual black signal levels in the black pixel periods. This combination removes the voltages of the offset signals OFF1+ and OFF1− from the residual black signal levels which, in turn, leaves an offset-corrected black signal level in each black pixel period.

Since the residual black signal levels in the black pixel periods in a line are combined with offset signals OFF1+ and OFF1− that represent a component color to form the offset-corrected black signal levels, the offset-corrected black signal levels in the black pixel periods in a line also represent a component color.

The offset signals OFF1+ and OFF1− that are output during the data pixel periods in a line are combined with the residual data signal levels in the data pixel periods. This combination removes the voltages of the offset signals OFF1+ and OFF1− from the residual data signal levels which, in turn, leaves an offset-corrected data signal level in each data pixel period.

The offset value FV that is received for a data pixel period is selected so that the component color represented by the offset value FV and the corresponding pair of offset signals OFF1+ and OFF1− match the component color represented by the residual data signal level in the data pixel period. As a result, the offset-corrected data signal level and the amplified data signal level in each data pixel period also represents a component color.

D/A converter 210 is preferably implemented with high-speed, differential, switched-capacitor amplifiers. D/A converters that utilize high-speed, differential, switched-capacitor amplifiers are known in the art.

As additionally shown in FIG. 2, image processing stage 200 further includes a programmable gain amplifier 212 that is connected to CDS 208 and D/A converter 210. Amplifier 212 receives a number of digital gain values GV at a gain input such that a gain value GV is received during each pixel period. The gain values GV, in turn, represent the component colors such that each gain value GV represents a single component color.

Amplifier 212 amplifies the offset-corrected black signal levels in the black pixel periods in response to a gain value GV to form an amplified black signal level in each black pixel period. Amplifier 212 also amplifies the offset-corrected data signal levels in the data pixel periods in response to the gain values GV to form an amplified data signal level in each data pixel period.

In the present invention, the gain value GV that is received for the black pixel periods is selected on a line-by-line basis so that a gain value GV of the number of gain values GV is received for each line. In addition, the component color of the gain value applied to a black pixel period matches the component color of the offset signal applied to the black pixel period. (Alternately, as described below, more than one gain value GV can be received for the black pixel periods of a line.) Thus, since the offset-corrected black signal level in each black pixel period represents a component color, the amplified black signal level in each black pixel period also represents a component color.

The gain value GV that is received for each data pixel period is selected so that the component color represented by the gain value GV matches the component color represented by the offset-corrected data signal level. Thus, since the offset-corrected data signal level in each data pixel period represents a component color, the amplified data signal level in each data pixel period also represents a component color.

Amplifier 212 is preferably implemented as a high-speed, differential, switched-capacitor amplifier. High-speed, differential, switched-capacitor amplifiers are known in the art. One example of such an amplifier would be a differential implementation of the switched-capacitor amplifier disclosed in U.S. Pat. No. 5,703,524 to Chen which is hereby incorporated by reference. (Amplifier 212 can also include a number of stages where the number of stages is defined by the amount of amplification that is required.)

Image processing stage 200 additionally includes an analog-to-digital (A/D) converter 214 that digitizes the amplified black signal levels in the black pixel periods to form a digitized black value for each black pixel period. In addition, converter 214 also digitizes the amplified data signal levels in the data pixel periods to form a digitized data value for each data pixel period.

Since the amplified black signal level in each black pixel period represents a component color, the digitized black value in each black pixel period in a line also represents a component color. Similarly, since the amplified data signal level in each data pixel period represents a component color, the digitized data signal level in each data pixel period also represents a component color.

As further shown in FIG. 2, stage 200 also includes a controller 220 that is connected to D/A converter 210 and the gain input of amplifier 212. Controller 220, which is preferably implemented as a state machine, outputs the offset and gain values FV and GV to D/A converter 210 and amplifier 212. Controller 220 includes an offset memory 222 that stores the offset values FV, and a gain memory 224 that stores the gain values GV.

Offset memory 222 includes a number of memory locations that correspond with the number of component colors. For example, if red, green, and blue colors are used, offset memory 222 includes three memory locations; one memory location for storing a red offset value, one memory location for storing a green offset value, and one memory location for storing a blue offset value.

Gain memory 224 also includes a number of memory locations. The number of memory locations in gain memory 224 is a function of the state machine used to implement controller 220. At a minimum, one gain memory location is required for each component color.

Gain memory 224 can also have a number of memory locations that correspond with the number of component colors in each independent line of the CFA. For example, a CFA that utilizes the Bayer pattern (two component colors in each line) with two independent lines requires four memory locations; two to describe the colors in the first line (green-red), and two to describe the colors in the second line (blue-green).

Further, the memory locations in gain memory 224 correspond with the order of the colors in each independent line. For example, if the order in the first independent line is green and red, then the first and second memory locations store green and red gain values, respectively. Similarly, if the order in the second independent line is blue and green, then the third and fourth memory locations store blue and green gain values, respectively.

With this arrangement, the state machine outputs the gain value GV from the first gain memory location for the first, third, fifth, and the subsequent second data pixel periods in the first line since these data pixel periods all have the same component color. Similarly, the state machine outputs the gain value GV from the second gain memory location for the second, fourth, sixth, and the subsequent second data pixel periods in the first line.

With the second line, the state machine outputs the gain value GV from the third gain memory location for the first, third, fifth, and the subsequent second data pixel periods since these data pixel periods all have the same component color. Similarly, the state machine outputs the gain value GV from the fourth gain memory location for the second, fourth, sixth, and the subsequent second data pixel periods in the second line.

Regardless of the number of gain memory locations utilized, the gain values stored in the memory locations in gain memory 224 are the gain values GV that need to be applied to an offset-corrected data signal level that has a maximum signal level so that the maximum signal level can be matched to the maximum input range of A/D converter 214. The gain values GV for each component color are different because the conversion efficiencies of the corresponding pixels are different.

For example, if the maximum signal level that an offset-corrected green data signal level can reach is a maximum green signal level, and the maximum green signal level requires a gain of x to be matched with the maximum input range of A/D converter 214, then x is stored in the gain memory locations that correspond with green.

Controller 220 is also programmable so that the frequency with which the offset and gain values FV and GV are output to D/A converter 210 and amplifier 212, respectively, can be synchronized with the frequency of the pixel periods of the image signals Vin+ and Vin−.

Prior to operation, the offset values FV for each component color are determined and stored in offset memory 222. Similarly, the gain values GV for each component color are also determined and stored in gain memory 224.

FIG. 3 shows a timing diagram that illustrates the operation of stage 200 in accordance with the present invention.

As with FIG. 1, the CCD image signal CCD OUT has a number of pixel periods PP that include data pixel periods DP and black pixel periods BP.

As shown in FIG. 3, after being reset to begin with the first pixel period in the first line, controller 220 receives a black clamp pulse BLKCLP that indicates that the black pixel periods are output from the CCD. In response to the black clamp pulse BLKCLP, controller 220 outputs a first offset value FV and a first gain value GV.

D/A converter 210 outputs a first pair of offset signals OFF1+ and OFF1− in response to the first offset value FV, while amplifier 212 amplifies the residual black signal level in each black pixel period in response to the first gain value GV.

The first pair of offset signals OFF1+ and OFF1− ideally remove the non-photon signal level so that the offset-corrected black signal level in each black pixel period in the first line is zero. (In addition to non-photon based charge, the non-photon signal level also includes error signal levels that have been added by CDS 208, amplifier 212, and A/D converter 214.) The amplified black signal levels are digitized by A/D converter 214.

As further shown in FIG. 3, after the black pixel periods of the image signals Vin+ and Vin− in the first line have been output from the CCD, controller 220 receives a beginning-of-line pulse BOL that indicates the beginning of the data pixel periods.

Controller 220 responds to the first data pixel period in the first line by outputting the offset value FV and the gain value GV which represent a component color that matches the component color of the offset-corrected data signal level in the first data pixel period.

D/A converter 210 outputs a pair of offset signals OFF1+ and OFF1− in response to the offset value FV. The offset signals OFF1+ and OFF1− remove substantially all of the non-photon signal level from the residual data signal level in the first data pixel period to form the offset-corrected data signal level in the first data pixel period.

Amplifier 212 receives the gain value GV for the first data pixel period and increases or decreases the amplification provided during the first data pixel period. As a result, when the offset-corrected data signal level in the first data pixel period has the maximum signal level, the amplified data signal level in the first data pixel period is matched to the maximum input range of A/D converter 214.

For example, if the data signal level in the first data pixel period represents green, controller 220 outputs the green offset value FV from offset memory 222 and the green gain value GV from gain memory 224 (from the first memory location if the memory locations match the order of the Bayer pattern).

D/A converter 210 outputs a pair of green offset signals OFF1+ and OFF1− that remove substantially all of non-photon signal level from the residual data signal level in the first data pixel period. Amplifier 212 receives the green gain value GV for the first data pixel period and increases or decreases the amplification provided during the first data pixel period.

Once the offset and gain values FV and GV for the first data pixel period have been output, controller 220 responds to the second data pixel period in the first line by outputting the offset value FV and the gain value GV which represent a component color that matches the component color of the data signal level in the second data pixel period.

D/A converter 210 outputs a pair of offset signals OFF1+ and OFF1− in response to the offset value FV. The offset signals OFF1+ and OFF1− remove substantially all of the non-photon signal level from the residual data signal level in the second data pixel period to form the offset-corrected data signal level in the second data pixel period.

Amplifier 212 receives the gain value GV for the second data pixel period and increases or decreases the amplification provided during the second data pixel period. As a result, when the amplified data signal level in the second data pixel period has the maximum signal level, the data signal level in the second data pixel period is matched to the maximum input range of A/D converter 214.

For example, if the data signal level in the second data pixel period represents red, controller 220 outputs the red offset value FV from offset memory 222 and the red gain value GV from gain memory 224 (from the second memory location if the memory locations match the order of the Bayer pattern).

D/A converter 210 outputs a pair of red offset signals OFF1+ and OFF1− that remove substantially all of non-photon signal level from the residual data signal level in the second data pixel period. Amplifier 212 receives the red gain value GV for the second data pixel period and increases or decreases the amplification provided during the second data pixel period.

When the Bayer pattern and three component colors are utilized, once the offset and gain values FV and GV for the second pixel period have been output, controller 220 responds to the third data pixel period by again outputting the offset and gain values FV and GV that were output to the first data pixel period. (The fifth pixel is the first repeating pixel if four colors are utilized such as in the CMYG pattern.) This process then continues for each data pixel period in the first line until the trailing edge of the beginning of line pulse BOL is detected.

The process continues when the leading edge of the black clamp signal BLKCLP is again received, indicating that the black pixel periods of the second line of the image signal Vin are output from the CCD. This time, however, controller 220 outputs a second offset value FV and a second gain value GV.

D/A converter 210 outputs a second pair of offset signals OFF1+ and OFF1− in response to the second offset value FV, while amplifier 212 amplifies the offset-corrected black signal level in each black pixel period in response to the second gain value GV. The second pair of offset signals OFF1+ and OFF1− ideally remove the non-photon signal level so that the offset-corrected black signal level in each black pixel period in the second line is zero. The amplified black signal levels are digitized by A/D converter 214.

After the black pixel periods of the image signals Vin+ and Vin− in the second line have been output from the CCD, controller 220 again receives the beginning-of-line pulse BOL. Controller 220 responds to the first data pixel period in the second line by outputting the offset value FV and the gain value GV which represent a component color that matches the component color of the offset-corrected data signal level in the first data pixel period of the second line.

D/A converter 210 outputs a pair of offset signals OFF1+ and OFF1− in response to the offset value FV. The offset signals OFF1+ and OFF1− remove substantially all of the non-photon signal level from the residual data signal level in the first data pixel period to form the offset-corrected data signal level in the first data pixel period in the second line. Amplifier 212 receives the gain value GV for the first data pixel period in the second line and increases or decreases the amplification provided during the first data pixel period.

For example, if the data signal level in the first data pixel period in the second line represents blue, controller 220 outputs the blue offset value FV from offset memory 222 and the blue gain value GV from gain memory 224 (from the third memory location if the memory locations match the order of the Bayer pattern).

D/A converter 210 outputs a pair of blue offset signals OFF1+ and OFF1− that remove substantially all of non-photon signal level from the residual data signal level in the first data pixel period in the second line. Amplifier 212 receives the blue gain value GV for the first data pixel period and increases or decreases the amplification provided during the first data pixel period in the second line.

Once the offset and gain values FV and GV for the first pixel period in the second line have been output, controller 220 outputs the offset and gain values FV and GV for the second data pixel period in the second line. This process then continues for each data pixel period in the second line until the trailing edge of the beginning-of-line pulse BOL is detected.

The process continues when the leading edge of the black clamp signal BLKCLP is again received, indicating that the black pixel periods of the third line of the image signal Vin are output from the CCD. This time, however, controller 220 outputs a third offset value FV and a third gain value GV.

After the black pixel periods of the image signals Vin+ and Vin− in the third line have been output from the CCD, controller 220 again receives the beginning-of-line pulse BOL. Controller 220 processes the data pixel periods in the third line in the same manner as the data pixel periods in the first line when two independent lines are utilized. Image processing stage 200 processes the data pixel periods in the third line until the trailing edge of the beginning of line pulse BOL is again detected.

Thus, the present invention allows the maximum signal level of each color to be amplified to match the maximum input range of the A/D converter by individually amplifying the data signal level in each data pixel period.

(Each data pixel period is not limited to a single gain value stored in a single memory location, and can have multiple gains stored in multiple memory locations. The multiple gain values can be discriminated on the basis of, for example, temperature. Thus, a first-first gain value GV for the first data pixel period in the first line can be output at a first temperature, while a second-first gain value GV for the first data pixel period in the first line can be output at a second temperature.)

Figure 4:
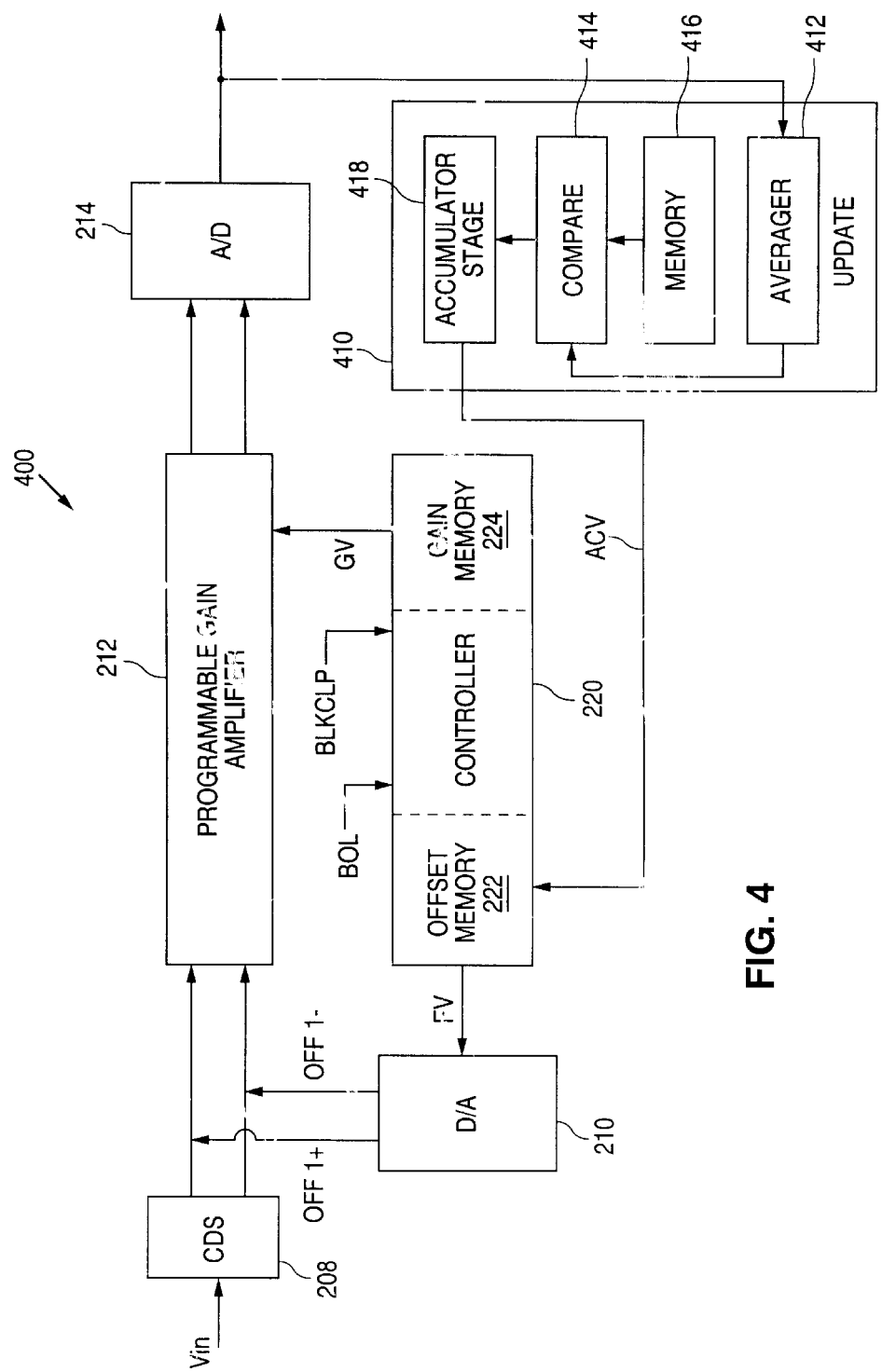
FIG. 4 is a block diagram illustrating an image processing stage 400 in accordance with a first alternate embodiment of the present invention.

FIG. 4 shows a block diagram of an image processing stage 400 in accordance with a first alternate embodiment of the present invention. Stage 400 is similar to stage 200 and, as a result, utilizes the same reference numerals to represent the structures which are common to both stages.

Stage 400 differs from stage 200 in that stage 400 includes an update circuit 410 that provides a feedback loop that allows the offset values to be updated. As shown in FIG. 4, update circuit 410 includes an averager 412 that sums the digitized black values in a line from A/D converter 214, and divides the sum by the number to determine an average digitized black value. Since the digitized black values in the black pixel periods in a line represent a component color, the average digitized black value for a line also represents a component color.

In addition, update circuit 410 also includes a compare circuit 414 and a memory 416. Compare circuit 414 compares the average digitized black value with a reference value stored in memory 416 to form a calculated value which represents the difference between the average digitized black value and the reference value. Since the average digitized black value represents a component color, the calculated value for a line also represents a component color.

Further, update circuit 410 includes an accumulator stage 418 that receives the calculated value for each line, and outputs an accumulated calculated value ACV for each line. Stage 418 includes an accumulator for each component color that accumulates each calculated value that represents the same component color, and outputs the accumulated calculated value ACV for the line in response to the accumulation.

For example, if three component colors are utilized, then stage 418 includes three accumulators: one accumulator to accumulate the calculated values that were determined for each line where the green offset and gain values were output during the black pixel periods; one accumulator to accumulate the calculated values that were determined for each line where the blue offset and gain values were output during the black pixel periods; and one accumulator to accumulate the calculated values that were determined for each line where the red offset and gain values were output during the black pixel periods.

In addition, controller 220 updates the offset values FV in response to the accumulated calculated values ACV output by the accumulators such that the offset value FV output to D/A converter 210 for the black pixel periods of a line is updated in response to the accumulated calculated value ACV for the line.

In operation, the offset values FV are updated during the black pixel periods such that only one offset value FV is updated during the black pixel periods of each line.

As noted above, in response to the first offset value following the black clamp pulse BLKCLP in the first line, D/A converter 210 outputs the first pair of offset signals OFF1+ and OFF1− which ideally remove the non-photon signal level so that the offset-corrected black signal level in each black pixel period in the first line is zero. Non-zero levels, however, are amplified and then digitized by A/D converter 214.

In accordance with the first alternate embodiment, the digitized non-zero amplified black signal levels are utilized to form the average digitized black value which is then compared with the reference value to form the calculated value which, in turn, is used to form the accumulated calculated value ACV. The accumulated calculated value ACV for the first line is used by controller 220 to update the first offset value FV stored in offset memory 222 so that the updated first offset value, when output to D/A converter 210, causes the offset-corrected black signal level in each of the black pixel periods in the first line to be ideally substantially zero.

For example, when controller 220 outputs a green offset value FV and a green gain value GV, D/A converter 210 outputs a pair of green offset signals OFF1+ and OFF1− that ideally remove the non-photon signal level so that the offset-corrected green-black signal level in each black pixel period in the first line is zero.

Non-zero green-black signal levels are amplified, digitized, averaged, and compared to the reference value to form a green calculated value which, in turn, is used to form a green accumulated calculated value ACV. Controller 220 then utilizes the green accumulated calculated value ACV to update the green offset value FV so that the updated green offset value, when output to D/A converter 210, causes the offset-corrected green-black signal level in each of the green pixel periods in the first line to be ideally substantially zero.

As further noted above, in response to the first offset value following the black clamp pulse BLKCLP in the second line, D/A converter 210 outputs the second pair of offset signals OFF1+ and OFF1− which ideally remove the non-photon signal level so that the offset-corrected black signal level in each black pixel period in the second line is zero. Non-zero levels, however, are amplified and then digitized by A/D converter 214.

The digitized non-zero amplified signal levels are utilized to form the average digitized value which is then compared with the reference value to form the calculated value which, in turn, is used to form the accumulated calculated value ACV. The accumulated calculated value ACV for the second line is used by controller 220 to update the second offset value FV stored in offset memory 222 so that the updated second offset value, when output to D/A converter 210, causes the offset-corrected black signal level in each of the black pixel periods in the second line to be ideally substantially zero.

For example, when controller 220 outputs a blue offset value FV and a blue gain value GV for the black pixel periods of the second line, D/A converter 210 outputs a pair of blue offset signals OFF1+ and OFF1− that ideally remove the non-photon signal level so that the offset-corrected blue-black signal level in each black pixel period in the second line is zero.

Non-zero blue-black signal levels are amplified, digitized, averaged, and compared to the reference value to form a blue calculated value which, in turn, is used to form a blue accumulated calculated value ACV. Controller 220 then utilizes the blue accumulated calculated value ACV to update the blue offset value FV stored in offset memory 222 so that the updated blue offset value, when output to D/A converter 210, causes the offset-corrected signal level in each of the blue-black pixel periods in the second line to be ideally substantially zero.

When three component colors are utilized, the offset value FV for the last color stored in offset memory 222, i.e., red, is updated during the black pixel periods of the third line. When the fourth, fifth, and sixth lines are read, the offset values FV for the first, second, and third component colors are again updated.

Similarly, if four component colors are utilized, then four lines are read to determine the offset values FV for the component colors. When the fifth, sixth, seventh, and eighth lines are read, the offset values FV for the first, second, third, and fourth component colors are again updated.

The process of updating only one offset value FV during each line is particularly useful when utilizing a CCD that has only a few black pixels in each line. When utilizing a CCD that provides a large number of black pixels with each line, more than one or all of the offset values can alternately be updated during each line. When all of the offset values are updated in a line, controller 220 sequentially outputs each of the offset values FV and the corresponding gain values GV during the black pixel periods (the component color of the gain value that is applied to a black pixel period matches the component color of the offset signal that is applied to the black pixel period).

For example, if a line includes 24 black pixel periods and three component colors are utilized, the digital black values for the first eight black pixel periods can be averaged, compared, and accumulated to update the offset value for the first component color, the digital black values for the second eight black pixel periods can be averaged, compared, and accumulated to update the offset value for the second component color, and the digital black values for the third eight black pixel periods can be averaged, compared, and accumulated to update the offset value for the third component color.

Figure 5:
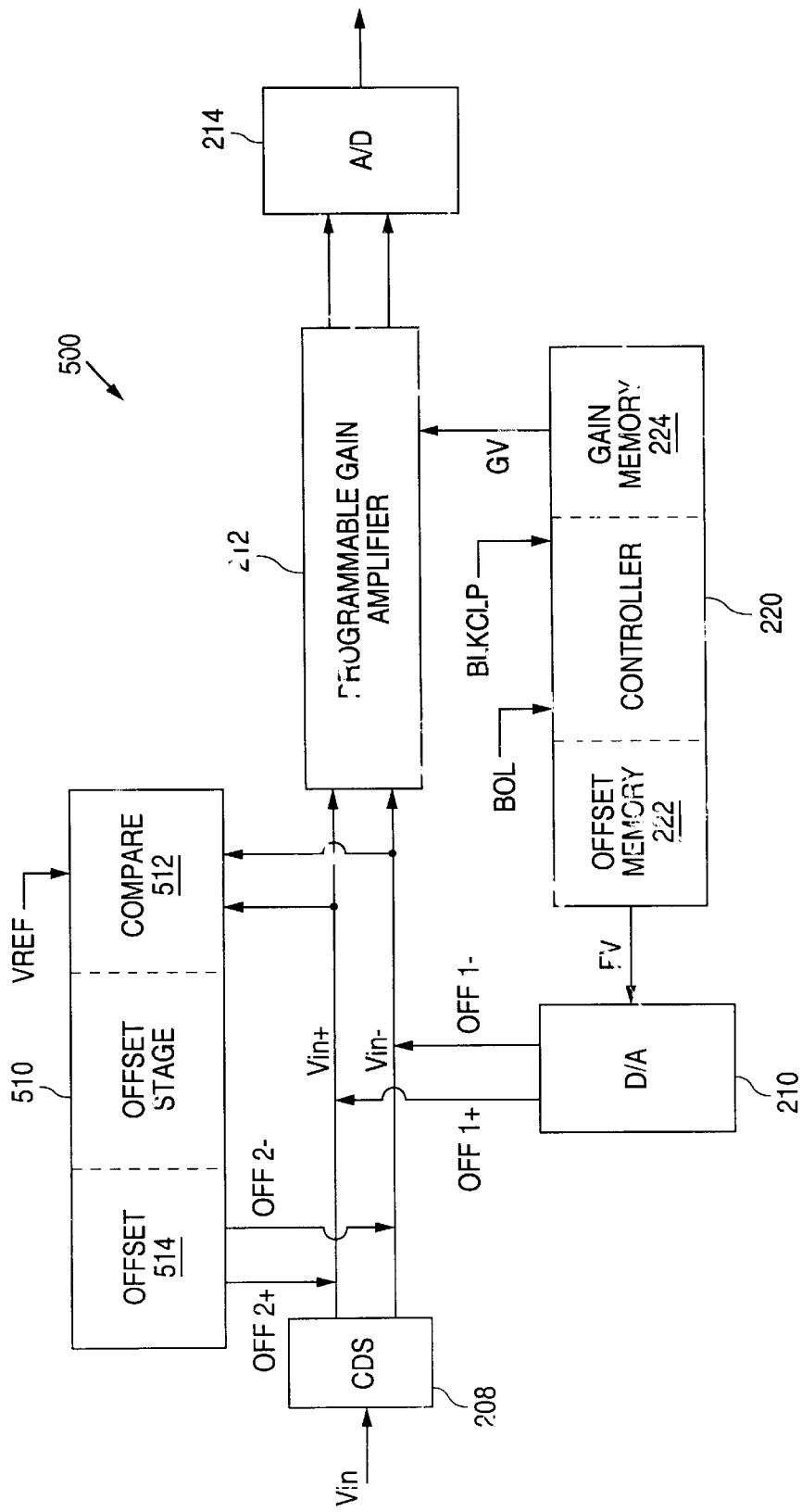
FIG. 5 is a block diagram of an image processing stage 500 in accordance with a second alternate embodiment of the present invention.

FIG. 5 shows a block diagram of an image processing stage 500 in accordance with a second alternate embodiment of the present invention. Stage 500 is similar to stage 200 and, as a result, utilizes the same reference numerals to represent the structures which are common to both stages.

As shown in FIG. 5, stage 500 differs from stage 200 in that stage 500 includes an analog offset stage 510 that includes a compare circuit 512 and an offset circuit 514. In operation, compare circuit 512 compares the residual black signal level in each of the black pixel periods of the image signals Vin+ and Vin− to a reference voltage VREF.

Offset circuit 514 then outputs a pair of second offset signals OFF2+ and OFF2− in response to the differences between the residual black signal level in each black pixel period and the reference voltage VREF. The offset signals OFF2+ and OFF2−, when combined with the residual black signal level in each black pixel period, remove the non-photon signal level, as well as any error signal level added by CDS 208, from the black pixel periods.

The offset signals OFF2+ and OFF2− are determined at the beginning of each line during the black pixel periods and, once determined, are continuously applied for the duration of the time required to read the line. The second alternate embodiment is particularly useful for high-gain applications where D/A converter 210 is unable to remove all of the non-photon signal level.

Figure 6:
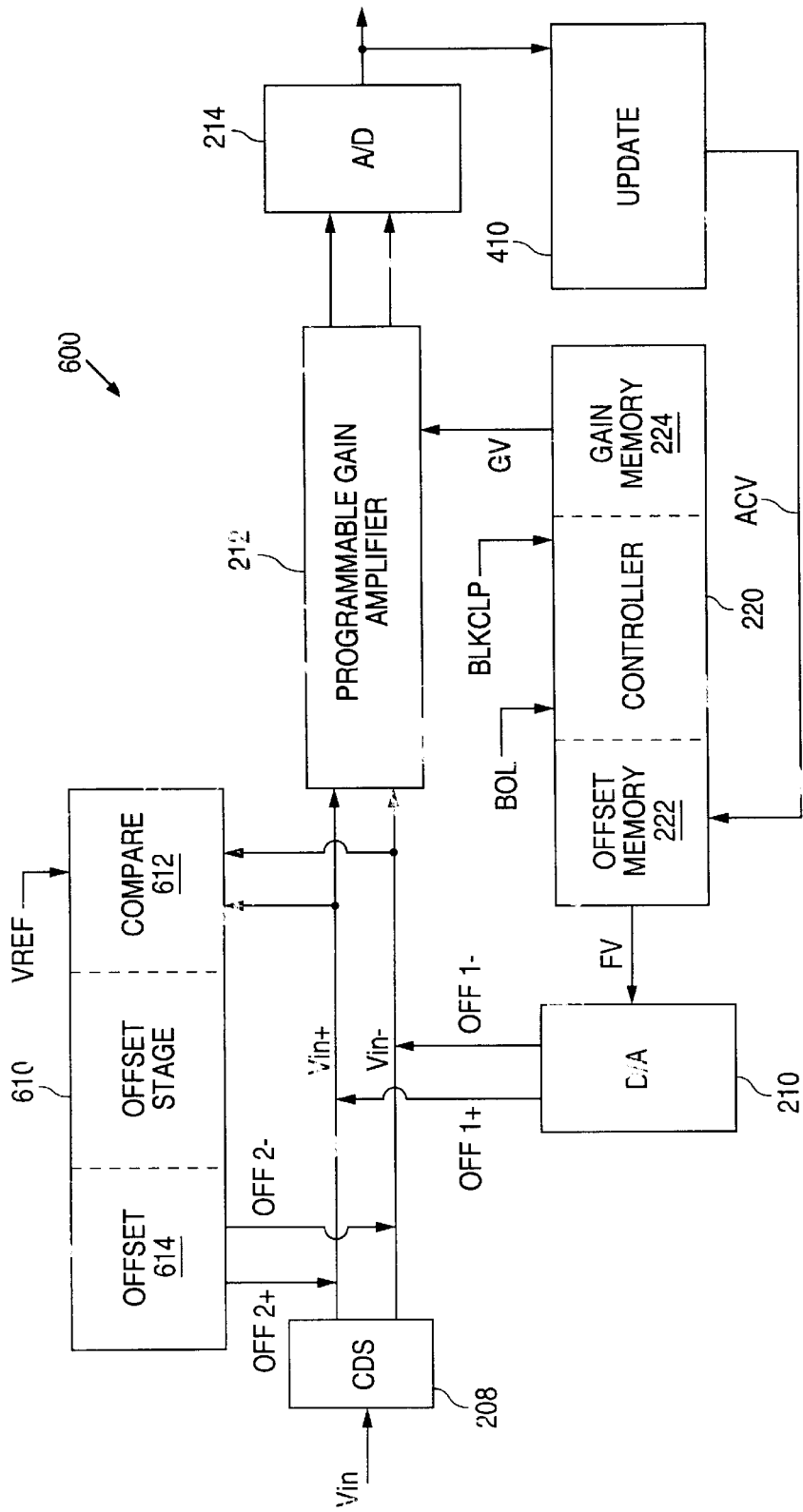
FIG. 6 shows a block diagram of an image processing stage 600 in accordance with a third alternate embodiment of the present invention.

FIG. 6 shows a block diagram of an image processing stage 600 in accordance with a third alternate embodiment of the present invention. Stage 600 is similar to stage 400 and, as a result, utilizes the same reference numerals to represent the structures which are common to both stages.

As shown in FIG. 6, stage 600 differs from stage 400 in that stage 600 includes an analog offset stage 610 that includes a compare circuit 612 and an offset circuit 614. Stage 610 operates the same as stage 512.

It should be understood that various alternatives to the embodiment of the invention described herein may be employed in practicing the invention. For example, the concepts of the present invention apply equally well to single-ended image signals (referenced to ground). Thus, it is intended that the following claims define the scope of the invention and that methods and structures within the scope of these claims and their equivalents be covered thereby.

What is claimed is:

1. An image processing stage for processing an image signal, the image signal having a plurality of pixel periods, the stage comprising:
   a correlated double sampler (CDS) connectable to receive the image signal, the CDS removing an effect of a reset signal from the image signal in each pixel period to leave a residual signal in each pixel period;
   a digital-to-analog (D/A) converter that converts offset values into offset signals and outputs the offset signals, the residual signal in each pixel period being combined with an offset signal to leave an offset-corrected signal in each pixel period;
   a programmable gain amplifier (PGA) that receives gain values, and amplifies the offset-corrected signal in each pixel period by a gain value of the gain values to form an amplified signal in each pixel period;
   an analog-to-digital (A/D) converter that digitizes the amplified signal in each pixel period to form a digitized value for each pixel period; and
   a controller that outputs the offset values to the D/A converter, and the gain values to the amplifier.

2. The stage of claim 1 wherein the residual signal within a pixel period corresponds with an imaging pixel that captures a color, the offset signal within the pixel period corresponds with the color, and the gain value used to amplify the offset corrected signal within the pixel period corresponds with the color.

3. The stage of claim 2 wherein
the image signal includes a data signal portion that includes photon information, and a black signal portion that includes non-photon information;
the black signal portion of the residual signal in a first pixel period is combined with a first offset value;
the data signal portion of the residual signal in a second pixel period is combined with the first offset value;
the black signal portion of the residual signal in a third pixel period is combined with a second offset value; and
the data signal portion of the residual signal in a fourth pixel period is combined with the second offset value.

4. The stage of claim 3 wherein
the black signal portion of the offset corrected signal in a pixel period is amplified by a first gain;
the data signal portion of the offset corrected signal in a pixel period is amplified by the first gain;
the black signal portion of the offset corrected signal in a pixel period is amplified by a second gain; and
the data signal portion of the offset corrected signal in a pixel period is amplified by the second gain.

5. The stage of claim 4 wherein
the offset signal output for a pixel period is equal to a value needed to remove error signals added by the CDS, the PGA, and the A/D converter, and non-photon based charge;
the CDS, the D/A converter, and the PGA are connected to a first node; and
D/A converter outputs the offset signals to the first node so that an offset signal is output during each pixel period.

6. The stage of claim 4 and further comprising an update circuit that forms an average digitized black value from a first number of black signal portions of the image signal, compares the average digitized black value with a digital reference value to form a calculated value for the first number of black signal portions, and accumulates the calculated value to form an accumulated calculated value, wherein the controller updates the first offset value with the accumulated calculated value.

7. An image processing stage that processes an image signal that has a first portion that corresponds with a first color and an adjoining second portion that corresponds with a different second color, the stage comprising:
a correlated double sampler (CDS) that receives the image signal, removes a reset component from the image signal to leave a residual signal that has a first portion that corresponds with the first color and an adjoining second portion that corresponds with the second color, and outputs the residual signal;
a digital-to-analog (D/A) converter that converts a first offset value into a first offset signal that corresponds with the first color, and a second offset value into a second offset signal that corresponds with the second color, and outputs the first and second offset signals, the first and second offset signals being different;
a programmable gain amplifier (PGA) that receives an offset corrected signal, a first gain value that corresponds with the first color, and a second gain value that corresponds with the second color, the offset corrected signal having a first portion that represents a combination of the first portion of the residual signal and the first offset signal, and an adjoining second portion that represents a combination of the second portion of the residual signal and the second offset signal, the PGA amplifying the first portion of the offset corrected signal with the first gain value and the second portion of the offset corrected signal with the second gain value, the first and second gain values being different; and
a controller that outputs the first and second offset values to the D/A converter, and the first and second gain values to the amplifier.

8. The stage of claim 7 wherein:
the input signal has a third portion that represents a third color, the first, second, and third colors being different;
the residual signal output by the CDS has a third portion that represents the third color;
the (D/A) converter converts a third offset value into a third offset signal that corresponds with the third color and outputs the third offset signal, the first, second, and third offset signals being different;
the offset corrected signal received by the PGA has a third portion that represents a combination of the third portion of the residual signal and the third offset value;
the PGA receives a third gain value that corresponds with the third color and amplifies the third portion of the offset corrected signal with the third gain value; the first, second, and third gain values being different; and
the controller outputs the third offset value and the third gain value.

9. The stage of claim 8 wherein:
the input signal has a fourth portion that represents a fourth color, the first, second, third, and fourth colors being different;
the residual signal output by the CDS has a fourth portion that represents the fourth color;
the (D/A) converter converts a fourth offset value into a fourth offset signal that corresponds with the fourth color and outputs the fourth offset signal, the first, second, third, and fourth offset signals being different;
the offset corrected signal received by the PGA has a fourth portion that represents a combination of the fourth portion of the residual signal and the fourth offset value;
the PGA receives a fourth gain value that corresponds with the fourth color and amplifies the fourth portion of the offset corrected signal with the fourth gain value, the first, second, third, and fourth gain values being different; and
the controller outputs the fourth offset value and the fourth gain value.

10. The stage of claim 7 wherein the first and second colors are non-black.

11. The stage of claim 8 wherein the first, second, and third colors are non-black.

12. The stage of claim 10 wherein:
the input signal has a third portion that corresponds with black;
the residual signal output by the CDS has a third portion that corresponds with black;
the offset corrected signal received by the PGA has a third portion that represents a combination of the third portion of the residual signal and the first offset value; and
the PGA amplifies the third portion of the offset corrected signal with the first gain value.

13. The stage of claim 11 wherein:
the input signal has a fourth portion that corresponds with black;

the residual signal output by the CDS has a fourth portion that corresponds with black;

the offset corrected signal received by the PGA has a fourth portion that represents a combination of the fourth portion of the residual signal and the first offset value; and the PGA amplifies the fourth portion of the offset corrected signal with the first gain value.

14. The stage of claim 9 wherein:

the input signal has a fifth portion that corresponds with black;

the residual signal output by the CDS has a fifth portion that corresponds with black;

the offset corrected signal received by the PGA has a fifth portion that represents a combination of the fifth portion of the residual signal and the first offset value; and the PGA amplifies the fifth portion of the offset corrected signal with the first gain value.

15. The stage of claim 7 wherein the image signal is generated by a pixel array, and the first and second portions of the image signal are generated by adjoining pixels on a same line.

16. The stage of claim 8 wherein the image signal is generated by a pixel array, the first and second portions of the image signal are generated by adjoining pixels on a first line, and the third portion of the image signal is generated by a pixel on a second adjoining line.

17. The stage of claim 12 and further comprising:

an analog-to-digital (A/D) converter that receives an amplified signal from the PGA, the amplified signal having a first portion that corresponds with the first color, an adjoining second portion that corresponds with the second color, and a third portion that corresponds with black, and digitizes the amplified signal to form a first value that represents the first portion of the amplified signal, a second value that represents the second portion of the amplified signal, and a third value that represents the third portion of the amplified signal; and an update circuit that forms an updated digitized black value using the third value; and wherein the controller updates the first offset value with the updated digitized black value.

18. The stage of claim 7 wherein:

the input signal has a third portion and an adjoining fourth portion that both correspond with black;

the residual signal output by the CDS has a third portion and a fourth portion that both correspond with black;

the offset corrected signal received by the PGA has a third portion that represents a combination of the third portion of the residual signal and the first offset value, and a fourth portion that represents a combination of the fourth portion of the residual signal and the first offset value; and the PGA amplifies the third and fourth portions of the offset corrected signal with the first gain value.

19. The stage of claim 18 and further comprising:

an analog-to-digital (A/D) converter that receives an amplified signal from the PGA, the amplified signal having a first portion that corresponds with the first color, an adjoining second portion that corresponds with the second color, a third portion that corresponds with black, and a fourth portion that corresponds with black, and digitizes the amplified signal to form a first value that represents the first portion of the amplified signal, a second value that represents the second portion of the amplified signal, a third value that represents the third portion of the amplified signal, and a fourth value that represents the fourth portion of the amplified signal; and an update circuit that forms an updated digitized black value using the third and fourth values; and wherein the controller updates the first offset value with the updated digitized black value.

20. The stage of claim 7 and further comprising an offset stage that outputs an offset stage signal, the offset corrected signal having a first portion that represents a combination of the first portion of the residual signal, the first offset signal, and the offset stage signal, and an adjoining second portion that represents a combination of the second portion of the residual signal, the second offset signal, and the offset stage signal.

21. The stage of claim 17 and further comprising an offset stage that outputs an offset stage signal, the offset corrected signal having a first portion that represents a combination of the first portion of the residual signal, the first offset signal, and the offset stage signal, an adjoining second portion that represents a combination of the second portion of the residual signal, the second offset signal, and the offset stage signal, and a third portion that represents a combination of the third portion of the residual signal, the first offset signal and the offset stage signal.

22. A method for processing an image signal that has a first portion that corresponds with a first color and an adjoining second portion that corresponds with a second color, the method comprising the steps of:

removing a reset component from the image signal to leave a residual signal that has a first portion that corresponds with the first color and an adjoining second portion that corresponds with the second color, and outputting the residual signal;

converting a first offset value into a first offset signal that corresponds with the first color and a second offset value into a second offset signal that corresponds with the second color, and outputting the first and second offset signals;

forming an offset corrected signal that has a first portion that represents a combination of the first portion of the residual signal and the first offset value, and an adjoining second portion that represents a combination of the second portion of the residual signal and the second offset value; and receiving a first gain value that corresponds with the first color and a second gain value that corresponds with the second color, and amplifying the first portion of the offset corrected signal with the first gain value and the second portion of the offset corrected signal with the second gain value.

23. The method of claim 22 wherein:

the input signal has a third portion that represents a third color;

the residual signal has a third portion that represents the third color;

a third offset value being converted into a third offset signal that corresponds with the third color;

the offset corrected signal has a third portion that represents a combination of the third portion of the residual signal and the third offset value;

a third gain value that corresponds with the third color is amplified the third portion of the offset corrected signal with the third gain value; and the controller outputs the third offset value and the third gain value.

* * * * *

UNITED STATES PATENT AND TRADEMARK OFFICE
CERTIFICATE OF CORRECTION

PATENT NO. : 6,774,941 B1
DATED : August 10, 2004
INVENTOR(S) : Boisvert et al.

It is certified that error appears in the above-identified patent and that said Letters Patent is hereby corrected as shown below:

Title page,
Item [56], References Cited, after "5,703,524 A 12/1997 Chen" insert -- 327/560 --.
OTHER PUBLICATIONS, delete the first occurrence of "Data sheet, "Preliminary Exar," XRD9855/9856; XRD98L55/98L56, CCD Image Digitizers with CDS, PGA, and 10-Bit A/D, pp. 30, Mar. 1999, Exar Corp., 48720 Kato Rd., Fremont, CA.*".

Column 2,
Line 50, delete "the-maximum" and replace with -- the maximum --.

Column 5,
Line 18, delete "are-arranged" and replace with -- are arranged --.

Column 6,
Line 15, delete "Vin+and Vin-" and replace with -- Vin+ and Vin- --.

Signed and Sealed this

Twenty-eighth Day of September, 2004

JON W. DUDAS
*Director of the United States Patent and Trademark Office*